United States Patent
Samudrala et al.

(10) Patent No.: US 12,321,423 B2
(45) Date of Patent: Jun. 3, 2025

(54) SOFTWARE LICENSE-BASED CODE SUGGESTIONS

(71) Applicant: Amazon Technologies, Inc., Seattle, WA (US)

(72) Inventors: Pramod Chandra Samudrala, Mercer Island, WA (US); Sri Ranga Akhilesh Bontala, Bothell, WA (US); Matthew Lee, Elmhurst, NY (US); Yanitsa Donchev, Kirkland, WA (US); Zijian Wang, San Jose, CA (US); Yuchen Tian, Santa Clara, CA (US); Himani Amrish Shah, Seattle, WA (US); Rama Krishna Sandeep Pokkunuri, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 17/937,438

(22) Filed: Sep. 30, 2022

(65) Prior Publication Data

US 2024/0111843 A1    Apr. 4, 2024

(51) Int. Cl.
*G06F 21/10* (2013.01)
*G06F 8/36* (2018.01)

(52) U.S. Cl.
CPC ............ *G06F 21/1075* (2023.08); *G06F 8/36* (2013.01)

(58) Field of Classification Search
CPC .......... G06F 21/1075; G06F 8/36; G06F 8/30; G06F 9/453; G06F 21/105
See application file for complete search history.

(56) References Cited

U.S. PATENT DOCUMENTS

| 7,552,429 B2 | 6/2009 | Dettinger et al. |
| 7,853,556 B2 | 12/2010 | Swaminathan et al. |
| 8,359,655 B1 * | 1/2013 | Pham ............ G06F 21/10 717/121 |

(Continued)

OTHER PUBLICATIONS

U.S. Appl. No. 18/329,504, filed Jun. 5, 2023, Trevor Andrew Morse, et al.

(Continued)

*Primary Examiner* — Michael Won
(74) *Attorney, Agent, or Firm* — S. Scott Foster; Kowert, Hood, Munyon, Rankin & Goetzel, P.C.

(57) ABSTRACT

A system for providing code suggestions according to licensing criteria is described. The system comprises computing devices that implement a code suggestion service. The code suggestion service receives a request that specifies licensing criteria via an interface of the code suggestion service. The code suggestion service determines respective licenses for respective source code files according to a source code attribution database from parsing the plurality of source code files that are applicable to the plurality of source code files. The code suggestion service generates a set of candidate code suggestions based, at least in part, on the plurality of source code files. The code suggestion service determines code suggestions from the set of candidate code suggestions that satisfy the licensing criteria based on the respective licenses. The code suggestion service provides the code suggestions determined from the set of candidate source code files that satisfy the licensing criteria.

20 Claims, 11 Drawing Sheets

(56) References Cited

U.S. PATENT DOCUMENTS

| | | |
|---|---|---|
| 8,972,372 B2 | 3/2015 | Elbaum et al. |
| 9,672,545 B2 | 6/2017 | Maclellan et al. |
| 9,977,672 B2 | 5/2018 | Leupold |
| 10,248,545 B2 | 4/2019 | Dominguez et al. |
| 10,423,594 B2 | 9/2019 | Olivier et al. |
| 11,327,722 B1* | 5/2022 | Bahrami ................. G06F 8/311 |
| 11,704,099 B1* | 7/2023 | Morse ..................... G06F 8/751 |
| | | 717/143 |
| 2003/0023963 A1* | 1/2003 | Birkholz .................. G06F 8/65 |
| | | 717/172 |
| 2006/0116966 A1* | 6/2006 | Pedersen ................ G06F 21/10 |
| | | 705/59 |
| 2009/0064091 A1 | 3/2009 | Tonkin et al. |
| 2010/0106705 A1* | 4/2010 | Rush ........................ G06F 8/36 |
| | | 707/723 |
| 2010/0115620 A1 | 5/2010 | Alme |
| 2011/0010304 A1* | 1/2011 | Chan Wong ....... G06Q 30/0276 |
| | | 705/317 |
| 2012/0089964 A1 | 4/2012 | Sawano |
| 2012/0143877 A1 | 6/2012 | Kumar et al. |
| 2013/0007700 A1 | 1/2013 | Villar et al. |
| 2014/0173563 A1 | 6/2014 | Dias et al. |
| 2015/0106111 A1 | 4/2015 | Gray et al. |
| 2016/0292580 A1 | 10/2016 | Sullivan et al. |
| 2018/0262864 A1 | 9/2018 | Reynolds et al. |
| 2019/0005206 A1 | 1/2019 | Sahoo et al. |
| 2019/0079752 A1 | 3/2019 | Makkar |
| 2019/0318366 A1* | 10/2019 | Carranza .................. G06N 3/08 |
| 2019/0324744 A1* | 10/2019 | Alam ........................ G06F 8/31 |
| 2021/0064723 A1* | 3/2021 | Drake .................... H04L 9/3247 |
| 2022/0236964 A1* | 7/2022 | Bahrami ................... G06F 8/74 |
| 2023/0418565 A1* | 12/2023 | Arumugam Selvaraj ................... |
| | | G06F 16/3322 |
| 2023/0418566 A1* | 12/2023 | Athiwaratkun ..... G06F 11/3608 |

OTHER PUBLICATIONS

U.S. Appl. No. 18/470,335, filed Sep. 19, 2023 Jiangtao Zhang, et al.

International Search Report and Written Opinion mailed Nov. 27, 2023 in PCT/US2023/074568, Amazon Technologies, Inc., pp. 1-11.

* cited by examiner

*800*

Receive, at a code suggestion service, a request that specifies one or more licensing criteria via an interface of the code suggestion service
802

↓

Determine respective licenses for respective ones of a plurality of source code files according to a source code attribution database that comprises indications of the respective licenses identified from parsing the plurality of source code files that are applicable to the plurality of source code files
804

↓

Generate a set of candidate code suggestions for received code input based, at least in part, on the plurality of source code files
806

↓

Determine one or more code suggestions from the set of candidate code suggestions that satisfy the one or more licensing criteria based, at least in part, on the respective licenses for respective ones of the plurality of source code files
808

↓

Provide the one or more code suggestions determined from the set of candidate source code files that satisfy the one or more licensing criteria
810

Identify, at a license attribution service, a plurality of source code files for license attribution
902

↓

Parse the plurality of source code files to extract one or more text blocks
904

↓

Compare the one or more text blocks to a plurality of licenses to determine similarity scores between respective ones of the one or more text blocks and the plurality of licenses
906

↓

Based on the similarity scores, identify one or more of the plurality of licenses that are applicable to individual ones of the plurality of source code files
908

↓

Store, to the source code attribution database, the indications of the respective licenses applicable to the respective ones of the plurality of source code files
910

FIG. 9

SOFTWARE LICENSE-BASED CODE SUGGESTIONS

BACKGROUND

Open-source software is considered to be a collaborative effort between different developers with different goals. Open-source code is made available for public inspection and viewing on public websites. Repositories host the open-source code for merging, forking, or pull requests by other developers who may want to integrate at least a portion of the code into their own projects. Generally, open-source code is subject to software licenses that dictate what a developer may do with open-source code written by another.

Predictive code suggestions may provide suggested code fragments that may be based on existing open-source code. The code suggestions may be based on existing source code files that are subject to their own licensing terms. Code suggestions might not necessarily take into account what limits may be applied to a current development session if source code is adopted from another open-source project.

BRIEF DESCRIPTION OF THE DRAWINGS

FIG. 8 is a flowchart diagram for a method for providing code suggestions according to licensing criteria, according to some embodiments.

FIG. 9 is a flowchart diagram for a method for attributing licenses to source code files, according to some embodiments.

Figure 1:
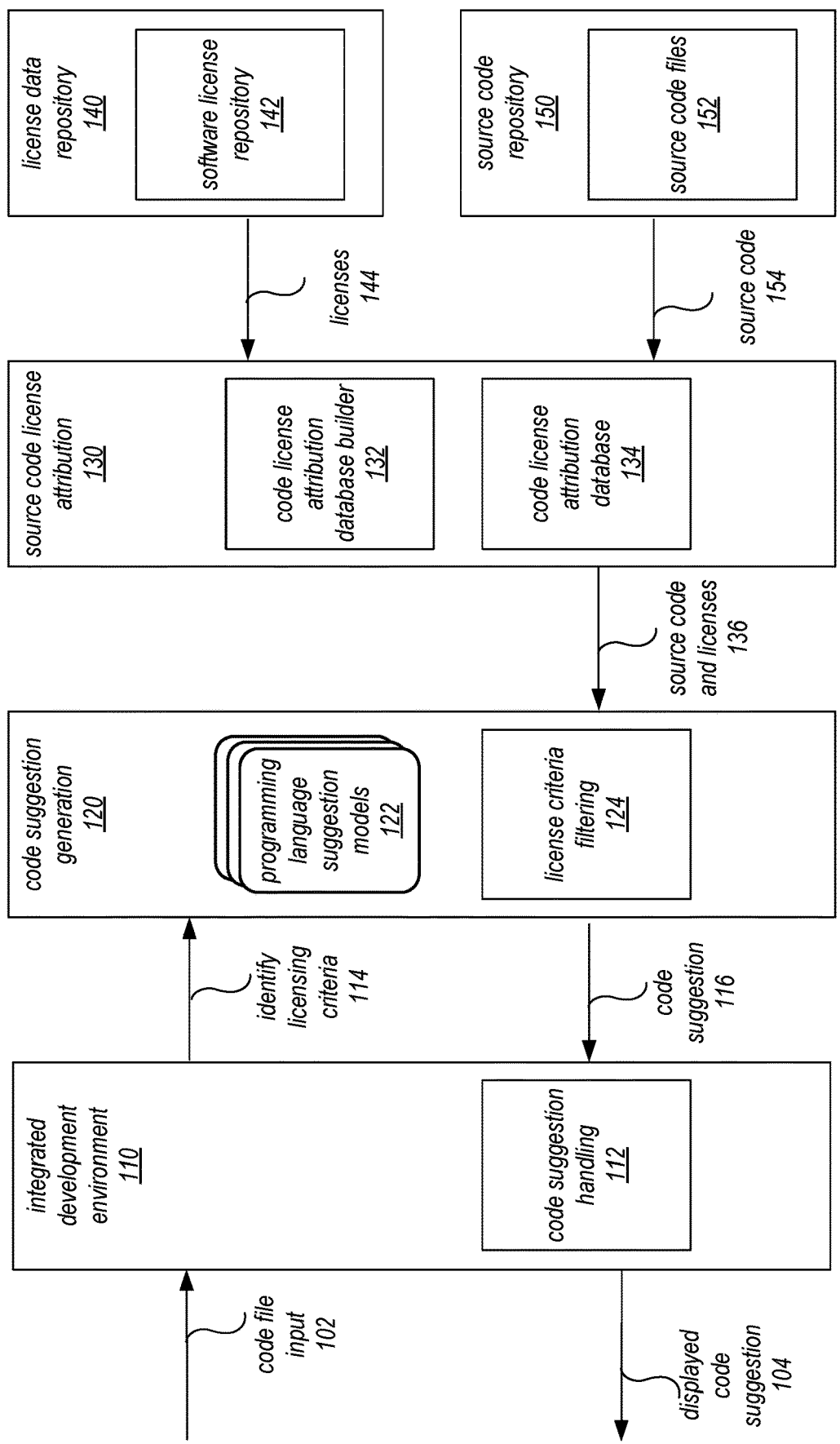
FIG. 1 illustrates a data flow diagram for a system for a code suggestion service, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various systems and methods for generating code suggestions are described. The code suggestions may be provided to a developer during a development session. The development session may be conducted using an integrated development environment ("IDE"). The developer may input code during the development session and request code suggestions from various external source code files. For example, the code suggestions may include functions or definitions from the source code files to be incorporated into the development session.

The code suggestions may be generated based on programming language suggestion models configured to apply machine learning models to various source code files to determine code portions to be suggested. The source code files may be provided by one or more source code repositories hosted by other developers. The source code files may be subject to one or more software licenses that affect the rights and obligations of developers that integrate the source code files into their own source code. For example, certain software licenses may require that the developer open source the code or that the developer is restricted from obtaining certain intellectual property protections, e.g., patents. The code suggestion service may be configured to limit potential code suggestions by filtering out source code files that are subject to particular types of software licenses.

The source code files may be filtered according to one or more licensing criteria. For example, the licensing criteria may indicate license terms or conditions that the developer intends to exclude from any source code files that are provided via the code suggestion service. As another example, the licensing criteria may indicate that the developer does not want to disclaim their patent rights in any software developed with imported source code files.

A source code license attribution service may generate a source code license attribution database. The source code license attribution database may correlate source code files to their respective licenses. For example, a particular source code file may be indicated as being subject to a particular software license. The database may also include data that indicates the licensing criteria that is included in the license. For example, the database may indicate that the particular software license has various criteria that may be used to filter or restrict the particular source code file from being included as a code suggestion candidate for developers that choose to restrict based on the licensing criteria.

In one aspect, a system is described. The system may include one or more computing devices that implement a code suggestion service. The code suggestion service may be configured to receive a request that specifies one or more licensing criteria via an interface of the code suggestion service. The code suggestion service may be configured to determine respective licenses for respective ones of a plurality of source code files according to a source code attribution database that comprises indications of the respective licenses identified from parsing the plurality of source code files that are applicable to the plurality of source code files. The code suggestion service may be configured to generate a set of candidate code suggestions for received code input based, at least in part, on the plurality of source code files. The code suggestion service may be configured to determine one or more code suggestions from the set of candidate code suggestions that satisfy the one or more licensing criteria based, at least in part, on the respective licenses for respective ones of the plurality of source code files. The code suggestion service may be configured to provide the one or more code suggestions determined from the set of candidate source code files that satisfy the one or more licensing criteria.

In another aspect, a method is described. The method may include performing, by one or more computing devices that implement a code suggestion service. The method may include determining respective licenses for respective ones of a plurality of source code files according to a source code attribution database that comprises indications of the respective licenses for the respective source code files. The method may include generating a set of candidate code suggestions for received code input based, at least in part, on the plurality of source code files. The method may include determining one or more code suggestions from the set of candidate code suggestions that satisfy one or more licensing criteria. The method may include providing the one or more code suggestions determined from the set of candidate source code files that satisfy the one or more licensing criteria.

In yet another aspect, one or more computer-readable storage media storing instructions are described. The instructions, when executed on or across one or more processors, cause the one or more processors to perform operations. The operations may include determining respective licenses for respective ones of a plurality of source code files according to a source code attribution database that comprises indications of the respective licenses for the respective source code files. The operations may include generating a set of candidate code suggestions for received code input based, at least in part, on the plurality of source code files. The operations may include determining one or more code suggestions from the set of candidate code suggestions that satisfy one or more licensing criteria. The operations may include providing the one or more code suggestions determined from the set of candidate source code files that satisfy the one or more licensing criteria.

FIG. 1 illustrates a data flow diagram for a system for a code suggestion service 100, according to some embodiments. The system 100 may include an integrated development environment ("IDE") 110, code suggestion generation 120, source code license attribution 130, and license data repository 140, according to various embodiments. The system 100 may include various computing devices to implement respective ones of IDE 110, code suggestion generation 120, source code license attribution 130, and license data repository 140. In some implementations, system 100 may be hosted as part of a provider network configured to provide computing-based services to clients.

IDE 110 may be deployed at a computing device, according to various embodiments. For example, IDE 110 may be implemented at a client computing device. As another example, IDE 110 may be implemented as a service provided by the provider network, such as a web-based interface. IDE 110 may receive inputs from a client, such as a software developer, according to some embodiments. For example, the inputs may include code file input 102. As another example, the inputs may include text inputs, software source code, source code files, software libraries, content assets, etc. Code suggestion handling 112 may proactively obtain and validate code suggestions 116 before providing them for display 104. In this way, higher latency programming language suggestion models 122 implemented as part of code suggestion generation 120 that offer better and more useable code suggestions 116 can be employed, even if their latency is longer than a smaller, but less accurate model, as the proactive requests can make the apparent latency be at or near 0 for code suggestions while still ensuring through validation that the suggestions are still valid (in light of potentially changing context, such as other code file input 102) before display 104.

IDE 110 may provide code suggestions to the client based on various criteria, according to some embodiments. For example, IDE 110 may provide code suggestions based on predicting upcoming text based on current text inputs from the client. In some embodiments, IDE 110 may send request 114 for code suggestion to code suggestion generation 120. Request 114 may also include various criteria to limit or filter out potential candidate code suggestions. For example, the developer may request that the presented code suggestions exclude specified characteristics with respect to their respective software licenses.

Source code files may be subject to software licenses based on text provided by their respective developers. For example, a given source code file for a given application may indicate that open source code is subject to a given open source license. For example, the open source license may include one or more of Apache License, BSD 3-Clause license, BSD 2-Clause license, GNU General Public License (GPL), GNU Library or "Lesser" General Public License (LGPL), MIT license, Mozilla Public License, Common Development and Distribution License, Eclipse Public License, or any other applicable open source license. Different license types may impose different limits or obligations of any developer that adopts open source code.

The developer of the code file input 102 may modify request 114 to indicate that certain license types or characteristics are to be included or excluded as part of code suggestion generation 120, according to various embodiments. For example, the request 114 may include licensing criteria that is used to exclude certain licenses from the code suggestions. Example licensing criteria may include intellectual property limitations, open source requirements, monetization limitations, reproduction limitations, or other types of characteristics about open source licenses. In some situations, the developer may not want to apply a particular type of license to the code file input 102, so the licensing criteria may be generated to exclude the particular type of license in request 114 for code suggestions.

As another example, IDE 110 may provide code suggestions based on external source code files from source code for which the client is currently editing. In some embodiments, code suggestion generation 120 may provide the code suggestions to IDE 110. In some situations, the code suggestions may include text for functions, variables, values, system calls, or other text inputs that may be entered by the client. In some embodiments, the code suggestions may be based on code that is imported from one or more external source code repositories.

Licensing criteria filtering 124 may filter candidate code suggestions by applying the licensing criteria from request 114, according to some embodiments. The candidate code suggestions may be determined based on source code and license information 136 provided by source code license attribution 130, according to some embodiments. Source code license attribution 130 may include code license attribution database builder 132. In some embodiments, code license attribution database builder 132 may generate code license attribution database 134. Code license attribution database 134 may include database records indicating respective licenses for respective source code files. For example, a given source code file may be indicated as having a given open source license that would be applied to any application that adopts the given source code file.

Code license attribution database builder 132 may generate code license attribution database 132 based on license information obtained from license data repository 140, according to some embodiments. License data repository 140 may include information pertaining to various licenses that may be applied to various pieces of software. For example, license data repository 140 may include software license database 142 configured to include records indicating different software licenses. Software license database 142 may include license identifiers and license text for the various licenses. In some embodiments, source code license attribution 130 may retrieve licenses from license data repository 140 and software license database 142.

Code license attribution database builder 132 may generate code license attribution database 134 based in part on the licenses obtained from software license database 142. For example, code license attribution database builder 132 may include information about the licenses, such as license terms and various criteria or characteristics about the licenses.

Source code license attribution 130 may obtain source code files from source code repositories, according to some embodiments. Source code license attribution 130 may parse the source code files to identify which licenses which are applicable to the respective source code files. In some embodiments, text included in the source code files may indicate the license that is attributed to the source code files. For example, source code license attribution 130 may analyze the text in the source code files to determine the attributed license. Source code license attribution 130 may populate or generate code license attribution database 134 based on the attributed license for respective source code files.

Source code license attribution 130 may provide source code and license information 136 to code suggestion generation 120, according to some embodiments. Code suggestion generation 120 may apply licensing criteria filtering 124 to generate a list of candidate code suggestions. In some embodiments, code suggestion generation 120 may include programming language prediction models configured to determine the list of candidate code suggestions. For example, the programming language prediction models may apply one or more machine learning techniques to predict the candidate code suggestions. In some implementations, licensing criteria filtering 124 may be used to train the programming language prediction models to improve subsequent results for candidate code suggestions. The list of candidate code suggestions may exclude licenses that do not satisfy the licensing criteria. The code suggestions Code suggestion 116 may be provided to IDE 110. Code suggestion handling 112 may validate code suggestion 116 for displaying 104 the code suggestion.

Figure 2:
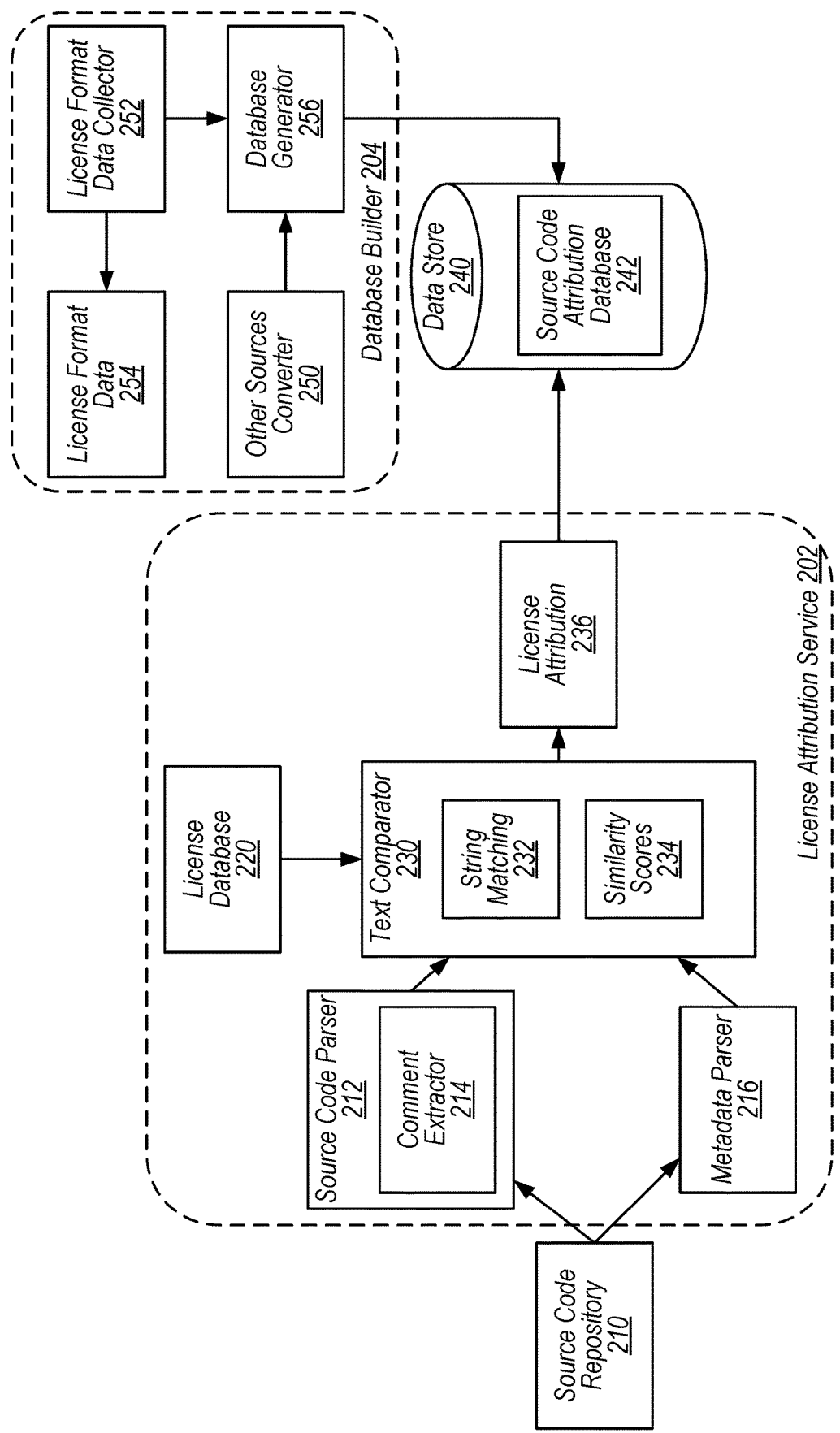
FIG. 2 is a block diagram of a system for source code license attribution, according to various embodiments.

FIG. 2 is a block diagram of a system 200 for source code license attribution, according to various embodiments. The system 200 may include license attribution service 202 and code license attribution database builder 204. System 200 may be implemented on or across one or more computing devices, including one or more processors and a memory that stores instructions to cause the one or more processors to perform various operations.

License attribution service 202 may receive an indication of source code repository 210 to attribute licenses to source code files of source code repository 210, according to some embodiments. Source code parser 212 may parse the source code files to determine whether portions of the source code files include indications of licenses that are attributable to the source code files. In some embodiments, source code parser 212 may include comment extractor 214 to extract commented code from the source code files for analysis. For example, open source licenses may be added to the source code files as text comments that do not directly affect execution of the source code. The parsed text may be sent to text comparator 230 to be compared against license text from license database 220, according to some embodiments.

License attribution service 202 may also include metadata parser 216, according to some embodiments. Metadata parser 216 may parse metadata from source code repository 210 to determine whether the metadata contains license-related information, according to some embodiments. For example, metadata parser 216 may obtain the metadata to extract license-based information. Metadata parser 216 may send the metadata to text comparator 230 to be compared against the license text from the license database 220, according to some embodiments.

Text comparator 230 may include string matching 232 configured to compare one or more strings of input text against strings contained in licenses identified in license database 220, according to some embodiments. For example, extracted text from the source code files may be compared against the licenses to determine which licenses were included as part of the source code files. In some situations, license text in the source code files may vary or differ from known versions of licenses in license database 220. For example, a developer that copied the license text from a secondary source may have minor variations in various terms or phrases found in the license text.

String matching 232 may be based on similarity matching, according to some embodiments. For example, the input text may be provided as N-grams to text comparator 230. String matching 232 may generate similarity scores 234 indicating a probability that the N-grams for respective input text of the source code files are likely to be of a particular license. For example, a similarity score of 0.95 or greater may indicate a high probability that the input text represents the particular license. As another example, a similarity score between 0.90 and 0.95 may indicate a low probability that the input text represents the particular license.

Based on the similarity scores, license attribution service 202 may apply license attribution 236 to attribute a particular license to respective source code files, according to some embodiments. License attribution 236 may associate a given source code file with a given license. License attribution 236 may register the given source code file with its corresponding license to source code attribution database 242 store in data store 240.

At least a portion of source code attribution database 232 may be generated by code license attribution database builder 204, according to some embodiments. For example, code license attribution database builder 204 may generate a baseline version of the database 232 that is filled in by license attribution 236. Code license attribution database builder 204 may include license format data collector 252, according to some embodiments. License format data collector 252 may collect license format data 254 from a license data repository. For example, license format data collector 252 may obtain license format data 254 from the Software Package Data Exchange (SPDX) license list. License format data 254 may include data structures for various software licenses that may be applied to open source software. Other sources converter 250 may receive user inputs, such as from the developer, to identify other licenses that may not necessarily provided from the license data repository. For example, the developer may decide to write their own license terms instead of adopting an existing license type. Database generator 256 may establish source code attribution database 242 according to license format data 254 and other license data as provided by other sources converter 250, according to some embodiments.

Figure 3:
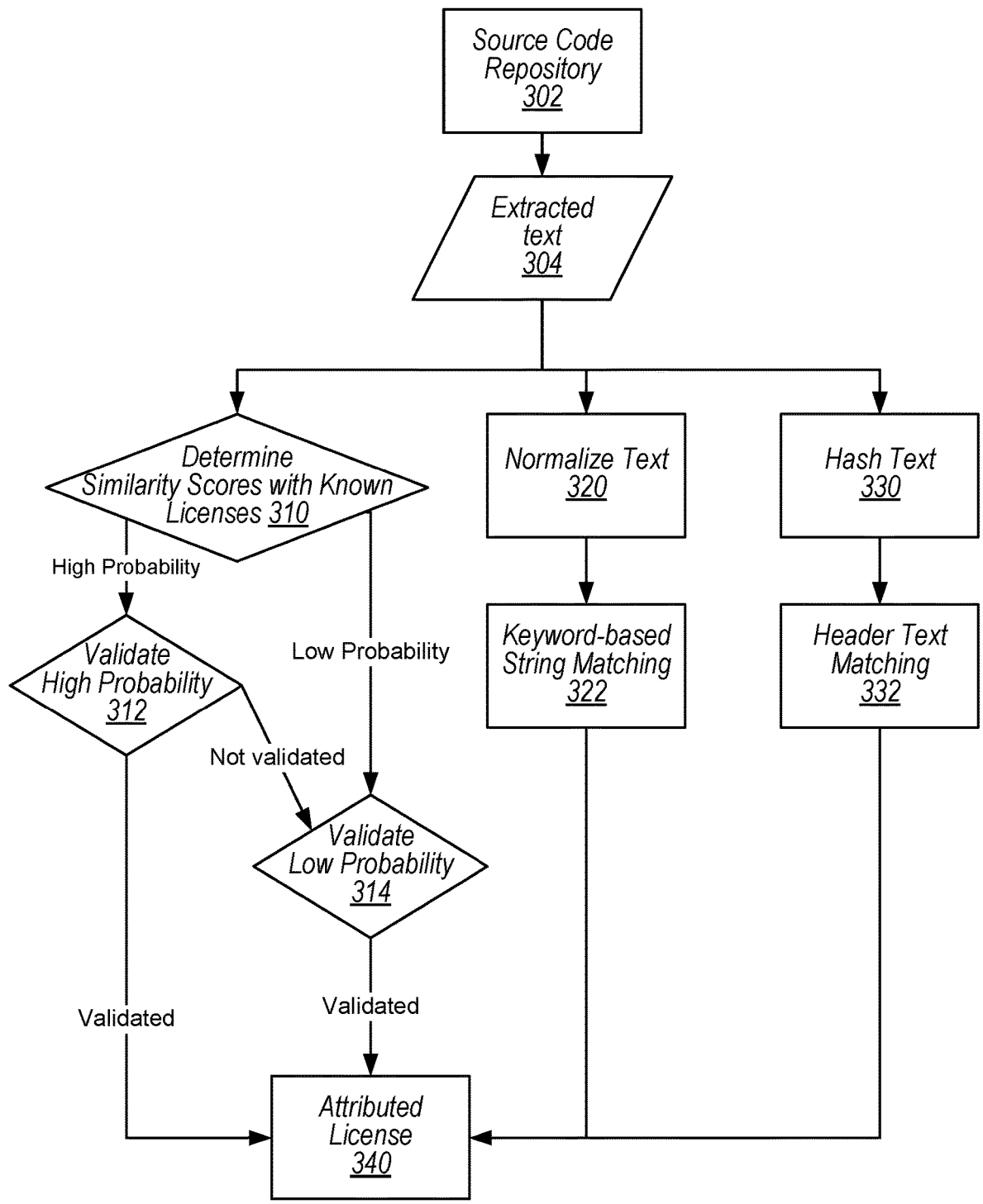
FIG. 3 illustrates a flowchart diagram for a system configured to attributing licenses to source code files, according to some embodiments.

FIG. 3 illustrates a flowchart diagram for a system 300 configured to attributing licenses to source code files, according to some embodiments. System 300 may be implemented by one or more computing devices, including one or more processors and a memory. In some embodiments, system 300 may include a license attribution service corresponding to source code license attribution 130 of FIG. 1 or license attribution service 202 of FIG. 2.

Source code repository 302 may provide source code files to system 300. Text from the source code files may be parsed as extracted text 304, according to some embodiments. Extracted text 304 may be processed in one of various methods to determine a license to be attributed to the source code files.

At 310, the system 300 may determine similarity scores with known licenses. In some embodiments, the similarity scores may be expressed as a number between 0 and 1. Based on the similarity scores indicating a high probability of a match to a given license, the high probability match may be validated, at 312. In some embodiments, clustered licenses may be segregated from non-clustered licenses. Clustered licenses may be validated to remove false positives using string-based matching. Based on a determination that the high probability match is validated, the source code file may be assigned attributed license 340. Based on a determination that the high probability match is not validated, validation may be retried as if the match was a low probability match.

Based on the similarity scores indicating a low probability of a match to a given license, the low probability match may be validated, at 314. In some embodiments, clustered licenses may be validated using unique string-based matching. Based on validation of the low probability match, the source code file may be assigned attributed license 340.

Extracted text 304 may also be normalized, at 320. The normalized text may be parsed according to keyword-based string matching, at 322. Based on a string match to a given license, the source code file may be assigned attributed license 340. Extracted text 304 may be hashed to generate hashed N-grams, at 330. The hashed N-grams may be parsed according to header text matching, at 332. Based on a header text match to a given license, the source code file may be assigned attributed license 340.

Figure 4:
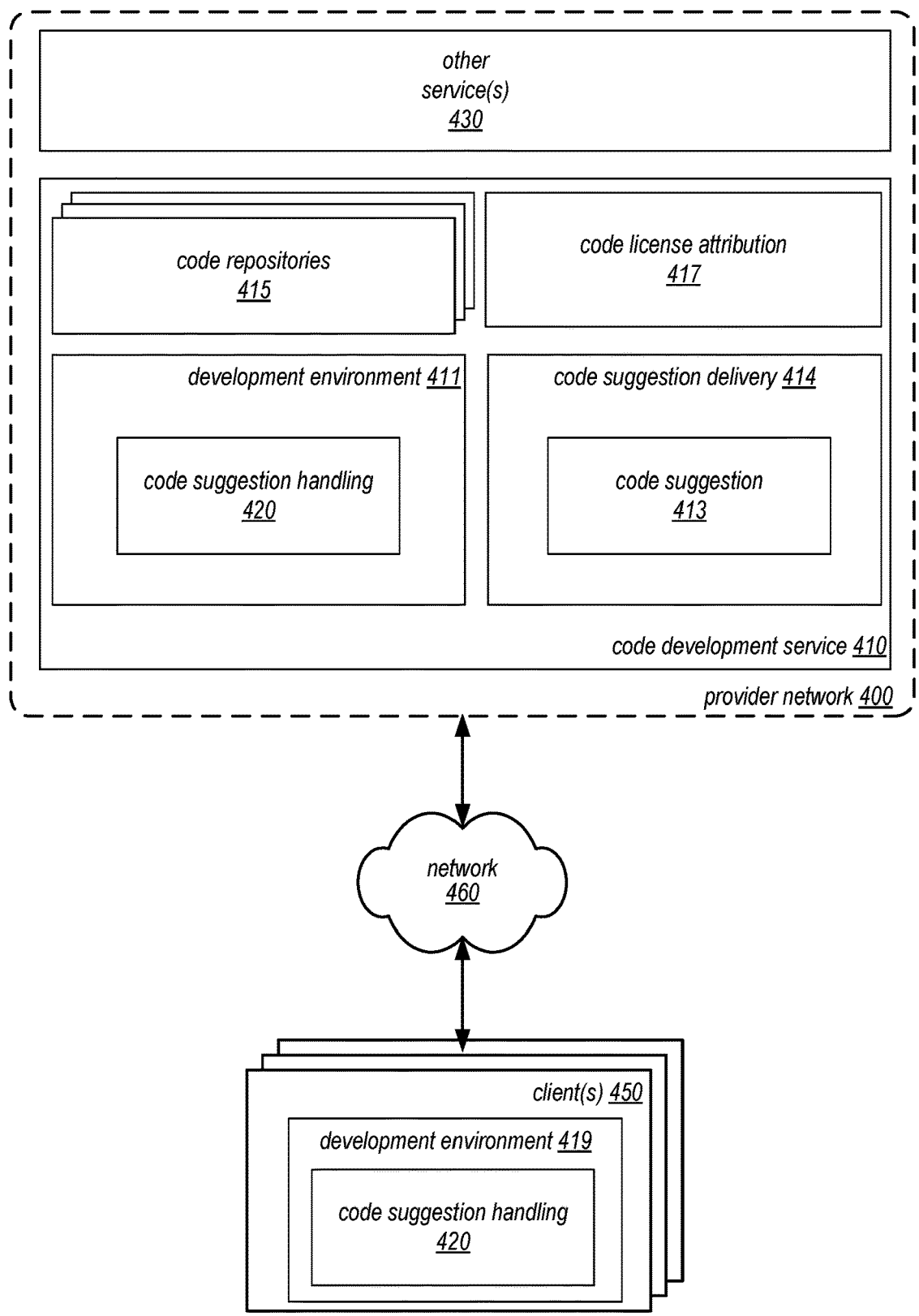
FIG. 4 is a logical block diagram illustrating a provider network that implements different services including a code development service, according to some embodiments.

FIG. 4 is a logical block diagram illustrating a provider network that implements different services including a code development service, according to some embodiments. A provider network 400 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 400 can provide convenient, on-demand network access to a shared pool of configurable computing resources that can be programmatically provisioned and released in response to customer commands. These resources can be dynamically provisioned and reconfigured to adjust to variable load.

The provider network 400 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 400 via a publicly accessible network (e.g., the Internet, a cellular communication network). Regions are connected to a global network which includes private networking infrastructure (e.g., fiber connections controlled by the cloud provider) connecting each region to at least one other region. The provider network 400 may deliver content from points of presence outside of, but networked with, these regions by way of edge locations and regional edge cache servers. This compartmentalization and geographic distribution of computing hardware enables the provider network 400 to provide low-latency resource access to customers on a global scale with a high degree of fault tolerance and stability.

As noted above, provider network 410 may implement various computing resources or services, such as code development service 410, and other service(s) 430 which may be any other type of network based services, including various other types of storage (e.g., database service or an object storage service), compute, data processing, machine learning, analysis, communication, event handling, visualization, and security services not illustrated).

In various embodiments, the components illustrated in FIG. 4 may be implemented directly within computer hardware, as instructions directly or indirectly executable by computer hardware (e.g., a microprocessor or computer system), or using a combination of these techniques. For example, the components of FIG. 4 may be implemented by a system that includes a number of computing nodes (or simply, nodes), each of which may be similar to the computer system embodiment illustrated in FIG. 11 and described below. In various embodiments, the functionality of a given system or service component (e.g., a component of code development service 410) may be implemented by a particular node or may be distributed across several nodes. In some embodiments, a given node may implement the functionality of more than one service system component (e.g., more than one data store component).

Code development service 410 may be implemented by provider network 400, in some embodiments. Code development service 410 may implement various features for writing code for different systems, applications, or devices, providing features to recommend, identify, review, build, and deploy code. For example, code development service 410 may implement development environment 411. Code development environment 411 may offer various code entry tools (e.g., text, diagram/graphics based application development) to specify, invoke, or otherwise write (or cause to be written) code for different hardware or software applications.

Code development service 410 may implement code suggestion delivery 414 which may implement various computing resources to host and implement code suggestion 413 in a scalable fashion to delivery on-demand code suggestions across large numbers of clients using high-powered machine learning models for high-quality code suggestion results. For example, code suggestion delivery 414 may implement workload balancing and request management features to handle and return code suggestions in a timely manner to provide real-time code suggestions with little or no apparent latency to code suggestion handling 420 (within or without provider network 400).

To avoid making development environments wait on multiple code suggestions to be sent in one communication, in some embodiments, code suggestion delivery 414 may implement pagination features for code suggestions to allow multiple code suggestions to be delivered from hosts or other computing resources implementing code suggestion 413 to recipient development environments 419 and 411 over multiple communications over time. In this way, code suggestions that are valid may be made and presented, and then updated as more are received. Such techniques offer a simulated streaming experience, without actually requiring bi-directional streaming to be supported at development environments. In this way, the benefits of fast delivery and update of code suggestions can be provided without introducing additional requirements onto development environments, which may not necessarily be maintained by the provider network 400 operator.

To implement pagination, code suggestions may be stored in service 410 as they are generated and can then be returned over multiple exchanges by utilizing a pagination token that accompanies the requests for code suggestions in order to allow for the additional code suggestions to be retrieved from storage and sent back to a development environment 419 or 411.

Figure 5:
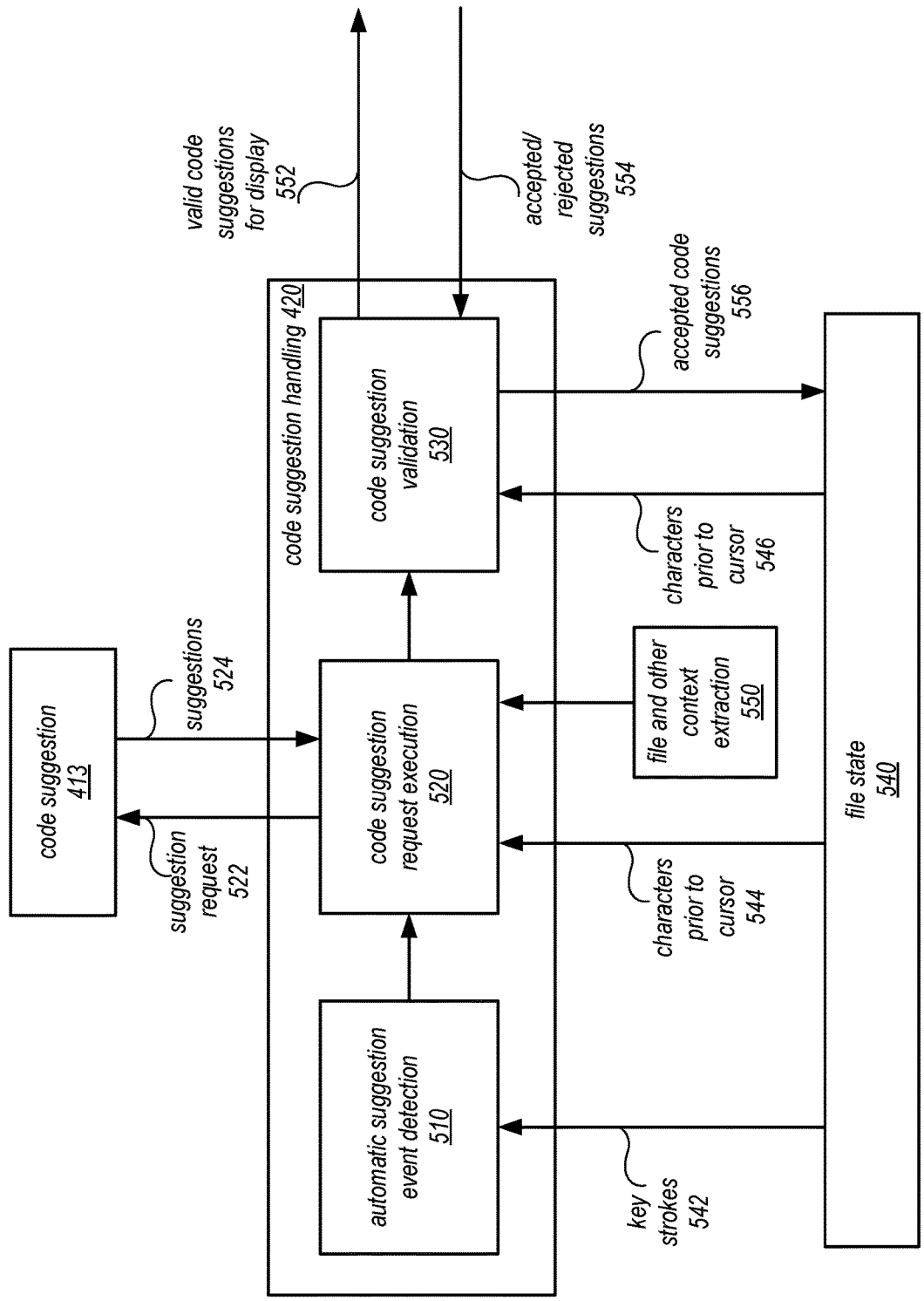
FIG. 5 is a logical block diagram illustrating code suggestion handling, according to some embodiments.

In various embodiments, code suggestion 413 may generate code suggestions based on text input in development environment 411 or 419 (e.g., utilizing a plug-in or other connection which may provide real-time analysis and suggestion of code as the code is entered into the development environment 411 or 419), as discussed in detail below with regard to FIG. 5. Code suggestion 413 may use generative models, machine learning models such as Generative Pre-trained Transformer (GPT), trained to generate code suggestions. Generative models are often trained on a large corpus of data for a specific task. In the case of generating code recommendations, this corpus of (e.g., from code suggestion code repositories 415 or other code repositories used to train the generative model) can be comprised of code repositories or snippets from a variety of sources. Depending on the source or owner, the code may be subject to certain licenses which need to be attributed in any usage or reproduction. Since a generative model can sometimes reproduce verbatim, or close to verbatim, matches to the training data, metadata for attributing the original source may also need to be provided as part of the suggestion. Code suggestion metadata (not illustrated) may provide the ability to provide metadata for code suggestions that may be provided.

Code development service 410 may implement (or have access to) code repositories 415. Code repositories 415 may store various code files, objects, or other code that may be interacted with by various other features of code development service 410 (e.g., development environment 411 to write, build, compile, and/or test code). Code repositories 415 may implement various version and/or other access controls to track and/or maintain consistent versions of collections of code for various development projects, in some embodiments. In some embodiments, code repositories may be stored or implemented external to provider network 400 (e.g., hosted in private networks or other locations).

Code development service 410 may include code license attribution 417. Code license attribution 417 may determine licenses that are attributed to respective source code files, such as code repositories 415. Attributed licenses may include open source licenses that may be adopted when the respective source code files are used in other projects.

Code development service 410 may implement an interface to access and/or utilize various features of code development service 410. Such an interface may include various types of interfaces, such as a command line interface, graphical user interface, and/or programmatic interface (e.g., Application Programming Interfaces (APIs)) in order to perform requested operations, including operations of development environment 411. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Generally speaking, clients 450 may encompass any type of client configurable to submit network-based requests to provider network 400 via network 460, including requests for services (e.g., a request for code search or suggestion, etc.). For example, a given client 450 may include a suitable version of a web browser, or may include a plug-in module or other type of code module that may execute as an extension to or within an execution environment provided by a web browser. Alternatively, a client 450 may encompass an application (or user interface thereof), a media application, an office application or any other application that may make use of resources in provider network 400 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 450 may be an application may interact directly with provider network 400. In some embodiments, client 450 may generate network-based services requests according to a Representational State Transfer (REST)-style network-based services architecture, a document- or message-based network-based services architecture, or another suitable network-based services architecture.

In some embodiments, a client 450 may provide access to provider network 400 to other applications in a manner that is transparent to those applications. For example, client 450 may integrate with code development service 410. However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 450 and the operating system or file system on behalf of applications executing within the operating system environment.

Clients 450 may convey network-based services requests to and receive responses from provider network 400 via network 460. In various embodiments, network 460 may encompass any suitable combination of networking hardware and protocols necessary to establish network-based-based communications between clients 450 and provider network 400. For example, network 460 may generally encompass the various telecommunications networks and service providers that collectively implement the Internet. Network 460 may also include private networks such as local area networks (LANs) or wide area networks (WANs) as well as public or private wireless networks. For example, both a given client 450 and provider network 400 may be respectively provisioned within enterprises having their own internal networks. In such an embodiment, network 460 may include the hardware (e.g., modems, routers, switches, load balancers, proxy servers, etc.) and software (e.g., protocol stacks, accounting software, firewall/security software, etc.) necessary to establish a networking link between given client 450 and the Internet as well as between the Internet and provider network 400. It is noted that in some embodiments, clients 450 may communicate with provider network 400 using a private network rather than the public Internet.

In some embodiments, provider network 400 may include the hardware (e.g., modems, routers, switches, load balancers, proxy servers, etc.) and software (e.g., protocol stacks, accounting software, firewall/security software, etc.) necessary to establish a networking links between different components of provider network 400, such as virtualization hosts, control plane components as well as external networks 460 (e.g., the Internet). In some embodiments, provider network 400 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 450 may be attached to the overlay network so that when a client 450 provides an IP address that they want to send packets to, the IP address is run in virtual space by communicating with a mapping service that knows where the IP overlay addresses are.

Perceived latency of code suggestions may reduce utilization of code suggestions as a feature. If, for instance, a user has to wait for a detectable period of time after requesting a code suggestion, user workflow can be disrupted. To eliminate perceived latency, code suggestions can be pre-fetched. However, as the input context may have changed since the code suggestion is requested, techniques for validating proactively obtained code completion suggestions may be implemented which ensure that a given recommendation is no longer consistent with the current state of the code. FIG. 5 is a logical block diagram illustrating code suggestion handling, according to some embodiments.

Code suggestion handling 420 may implement automatic suggestion event detection 510 which may evaluate key strokes 542, time elapsed, special keys, or user specific data to detect events. This information may be maintained as part of a user-specific state which may be updated or reset when a code suggestion request is submitted, in various embodiments. For instance, key-strokes, elapsed time, or other measures may be reset. Special keys may also be triggering events (and also may be evaluated in combination with other criteria, such as time elapsed. For example, an event that triggers obtaining a code completion suggestion may include entry of "{" "[" ":" "ENTER KEY" or "TAB KEY" and an elapsed time threshold. In some embodiments, automatic suggestion event detection 510 may use client-specific events, such as the entering of specific keys or characters in a pattern specific to the client (or configured/described by the client in a request to configure suggestion handling 420.

Code suggestion request execution 520 may handle the formation, assembly, sending, and processing of responses from code suggestion 413, including sending requests 522 to obtain code completion suggestions and process returned code suggestions 524. For example, code suggestion request execution 520 may obtain the context window of tokens (e.g., N previous tokens prior to a cursor) from file state 540, as indicated at 544. In some embodiments, file and other context information may be sent, as provided by file and other context extraction 550.

File and other context extraction 550 may utilize different techniques to obtain file and other context information outside of the context window (e.g., outside of N previous tokens). For example, file context may be taken from same file as the code suggestion is being generated for inclusion in. Information that may be obtained for file context may include boundary in the current scope, (e.g., code and comments limited by the current function to provide local context), class-level information, including class declaration, class constructors (e.g., the_init_function), and function level information for all other public or protected methods defined on the class, function-level information, including all functions declared in the current file on both sides of the cursor. In some embodiments, a signature, docstring, and return statement(s) may be extracted and/or variable-level information, including all previous variable declarations, which are visible to the current generation focus.

Other context that may be extracted at 550 may be in-project context. In modern code development, classes and functions are usually defined in hierarchical structured files. Simple backward looking context does not include information outside of the current file, which may cause certain scenarios where machine learning model is not likely to generate the right code. As may code files use imported classes/functions/variables, adding this context may significantly improve code generation performance. Thus, in-project context may be added in some embodiments, where all imported classes, functions, and variables from the same project and used for obtaining a code completion suggestion.

Other context that may be extracted at 550 may be out-of-project context. Out-of-project context may refer to classes/functions/variables imported from other packages into the current file. This is may have suggestion quality impact when the imported packages are under the zero-shot setting, (e.g., when the pretraining model does not have prior knowledge on the packages. Thus, other context may be obtained by scanning out-of-project context for packages not included in pretraining data and including corresponding classes/functions/variables as context in the request.

File and other context extraction 550 may perform regular expression based searches (e.g., for keywords such as "import") and extractions to obtain the various types of context discussed above. In some embodiments, parsing-based extraction may be used (e.g., by generating a symbol tree or other parse graph of the code to obtain the other context information).

Code suggestion request execution 520 may interact with code suggestions provided in paginated form. For example, a response to a request for code suggestions, 524, may include a pagination token indicating that further suggestions may be retrieved. Code suggestion request execution 520 may still proceed to validate and provide the suggestion through code suggestion validation 530 while also submitting a subsequent request 522 with the pagination token to obtain further code suggestion results, which may then be returned, validated, and provided. In this way, multiple suggestions can be made, allowing for different performance times for code suggestions to be generated, including potentially better code suggestions that may be provided while a user is reviewing initial suggestions.

File state 540 may provide information to various stages and may include both the code file and its associated metadata, in some embodiments. File state 540 may also provide information for code suggestion validation 530, such as the current characters prior to a cursor.

Code suggestion validation 530 may validate received code suggestions before providing them for display. For example, code suggestion validation may use one or more validation criteria to determine whether a code suggestion's added characters are a match or near match of the characters prior to the cursor (and added after the time at which the code suggestion request was made). Valid code suggestions may be provided for display, as indicated at 552. In some embodiments, acceptance (or rejection) of these suggestions may be received, as indicated at 554 and passed along to or included in file state 540, as indicated at 556.

Figure 6:
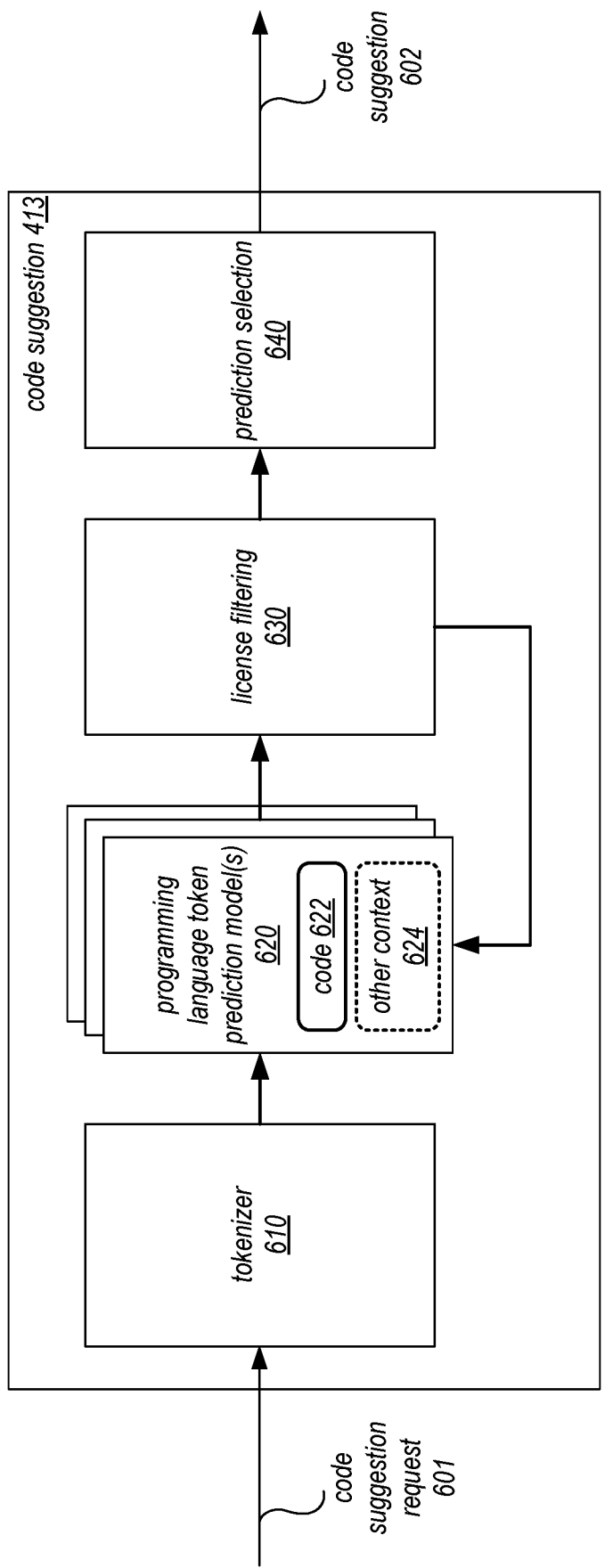
FIG. 6 is a logical block diagram illustrating code suggestion, according to some embodiments.

Code suggestion validation 530 may identify and display 548 valid coded suggestions as well as handle acceptance or rejections of the suggestions. Code suggestion 413 may be implemented to provide various code suggestions in different scenarios. FIG. 6 is a logical block diagram illustrating code suggestion, according to some embodiments. Code suggestion request 601 may be received at tokenizer 610. For example, various different tokenizers or tokenization techniques may be used. Tokens may be individual words in sentences, including the prior space character before the word, "[space]word" as token. Punctuation, empty space, carriage returns, or various other characters may also be grouped or considered individually as tokens.

Programming language token prediction model(s) 620 may use the provided code 622, as well as other context 624 like file context outside of a token window or other files which may be obtained using techniques like regular expression or parsing, as discussed above with regard to FIG. 5. Programming language specified token prediction models 620 may be used (e.g., model A for language A, model B for language B, and so on). Each of them may be trained the code in the respective programming language as well as the other context to produce recommendations. Programming language token prediction models 620 may also be trained on other context information (e.g., same-file, same-project, or other context) as discussed above with regard to FIG. 5.

In some embodiments, code development service 410 may support custom programming language models. For example, training data or code data from a user's specific code repository may be provided for training the custom programming language model, so that it may be used for code suggestions.

The predictions may be provided to license filtering 630, which may filter or limit predictions based on licensing criteria provided by the client. After license filtering 630, the filtered predictions may be provided to selection 640, which may select one based on confidence scores to provide as the code suggestion. In some implementations, licensing filtering 630 may be used to train the programming language prediction models to improve subsequent results for candidate code suggestions. In some embodiments, multiple predictions may be provided in paginated or other multi-result forms, as discussed above with regard to FIG. 5.

One scenario that can occur machine learning models that generate text recommendations is when the input has a partial word such as "Syst". In these scenarios, machine learning models tend to provide poor predictions and thus poor suggestions (e.g., generating gibberish or incoherent generations). This happens because the model only sees word tokens as input units. To overcome this scenario, backtracking to the last complete tokens and constraining the generation to match with the prompt suffix which is "Syst" here. Constraining the generation, as discussed below, helps improving accuracy on sub-word data metrics without compromising gains on generic evaluation sets.

Given a string prompt, the incoherence from normal decoding can be caused by the suffix of that prompt which can occur potentially with a sub-word that is not a complete token. Matching of the input string suffix may be performed with all available tokens that start with that suffix or that the suffix starts with. In some embodiments, the matching is done efficiently using a character-trie data structure (e.g., with native Pytorch arrays as node lists for fast concatenation). Based on the list of matching tokens, other tokens may be masked out during next token prediction, therefore ensuring that the generation will match the suffix character-by-character. Further latency optimizations may be achieved by caching very frequent suffixes such as single space by keeping a Boolean mask. For each step that is matched with the suffix, after each token generation step, the matching token is removed (by characters) from the left of the suffix and perform constrained generation until the suffix is an empty string. In some embodiment, the partial token (e.g., suffix) is determined by using the same pre-token split as in the tokenizer's 610 pre-token strategy which performs splitting using word boundaries—this allows for efficient backtracking for character matching since it may be known deterministically that any partial token cannot have crossed the pre-token boundary.

Figure 7:
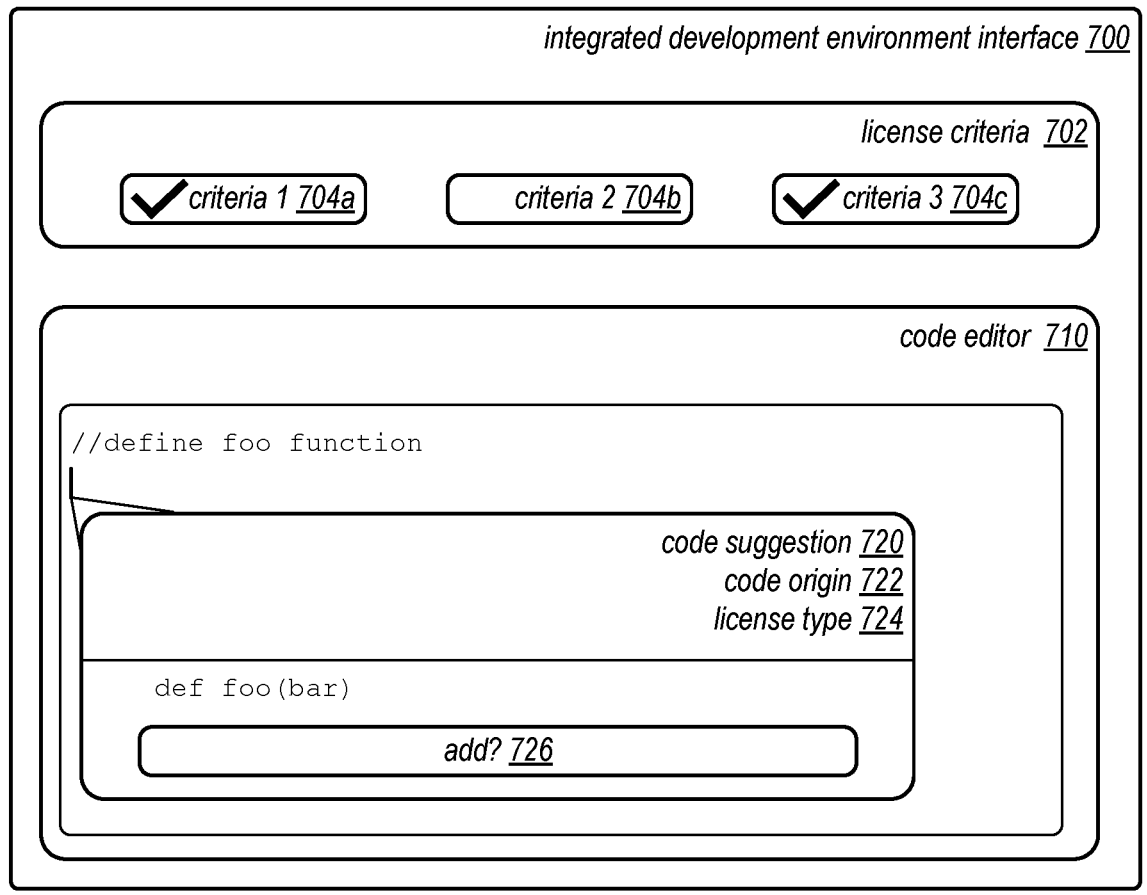
FIG. 7 is a logical block diagram illustrating an example interface of a development environment, according to some embodiments.

FIG. 7 is a logical block diagram illustrating an example interface of a development environment, according to some embodiments. Integrated development environment interface 700 may be implemented on a client of the code development service 410, as depicted in FIG. 4, or hosted as part of the code development service 410, as depicted in FIG. 4.

Integrated development environment interface 700 may include licensing criteria 702, which may allow a user to select different criteria 704 to be included or excluded from code suggestions. For example, as illustrated in FIG. 7, criteria 1 704a and criteria 3 704c are selected, while criteria 2 704b is unselected. Source code files that have licenses that match with criteria 2 may be excluded from potential code suggestions, according to various embodiments.

Integrated development environment interface 700 may implement a code editor 710 (e.g., a text editor) which may allow the user to enter code in a programming language. The code suggestion feature 413 of code development service 410 may analyze the entered characters to determine a code suggestion 720, which may be displayed with indications of code origin 722 and a license type 724. The code suggestion may be added, as indicated at 726. Although not illustrated, various other information regarding code metadata (e.g., style guidelines) may be displayed.

FIG. 8 is a flowchart diagram for a method 800 for providing code suggestions according to licensing criteria, according to some embodiments. The method 800 may be implemented by one or more computing devices. The method 800 may be implemented as a code suggestion service in some embodiments. The code suggestion service may correspond to code suggestion generation 120 of FIG. 1 or code suggestion handling 413 of FIG. 4, according to various embodiments.

The method 800 may include receiving a request that specifies one or more licensing criteria via an interface of the code suggestion service. The request may be provided by a client, such as a developer, to limit or filter code suggestions according to the licensing criteria.

The method 800 may also include determining respective licenses for respective ones of a plurality of source code files according to a source code attribution database that comprises indications of the respective licenses identified from parsing the plurality of source code files that are applicable to the plurality of source code files. In some embodiments, determining the respective licenses may include parsing the source code files to identify licenses that are contained in the source code files. In some embodiments, the source code attribution database may include records that indicate the respective licenses.

The method 800 may further include generating a set of candidate code suggestions for received code input based, at least in part, on the plurality of source code files. The method 800 may also include determining one or more code suggestions from the set of candidate code suggestions that satisfy the one or more licensing criteria based, at least in part, on the respective licenses for respective ones of the plurality of source code files. The method 800 may conclude by providing the one or more code suggestions determined from the set of candidate source code files that satisfy the one or more licensing criteria.

FIG. 9 is a flowchart diagram for a method 900 for attributing licenses to source code files, according to some embodiments. The method 900 may be implemented by one or more computing devices. The method 900 may be implemented by source code license attribution 130 of FIG. 1, license attribution service 202 of FIG. 2, or code license attribution 417 of FIG. 4, according to some embodiments.

The method 900 may include identifying the plurality of source code files for license attribution. The method 900 may include parsing the plurality of source code files to extract one or more text blocks. The method 900 may further include comparing the one or more text blocks to a plurality of licenses to determine similarity scores between respective ones of the one or more text blocks and the plurality of licenses. The method 900 may include based on the similarity scores, identifying one or more of the plurality of licenses that are applicable to individual ones of the plurality of source code files. The method 900 may conclude by storing, to the source code attribution database, the indications of the respective licenses applicable to the respective ones of the plurality of source code files.

Figure 10:
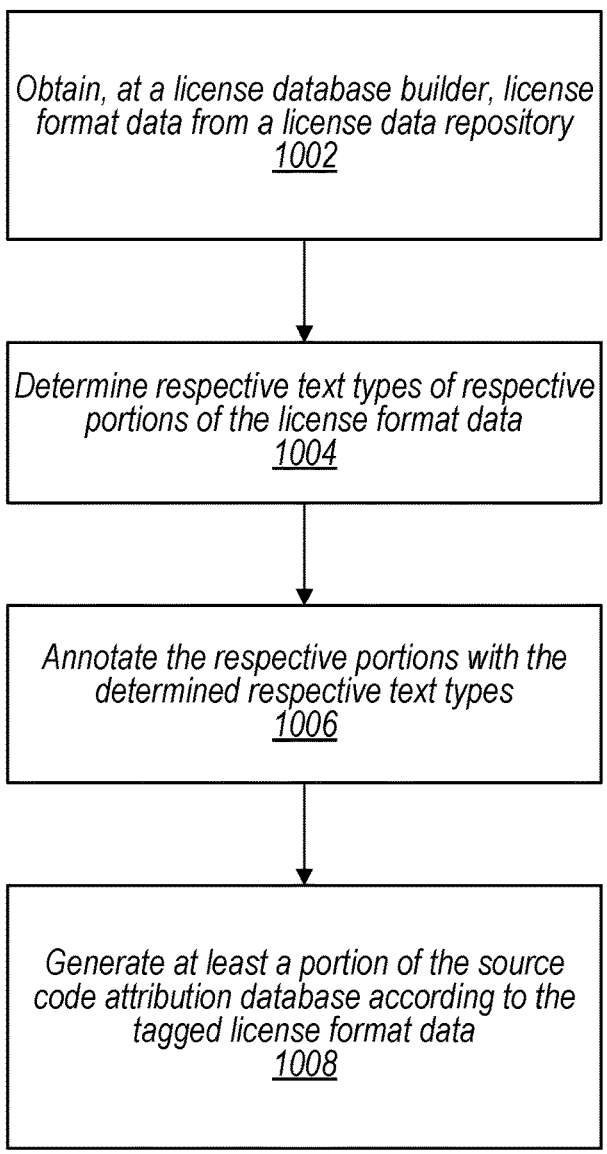
FIG. 10 is a flowchart diagram for a method for parsing license format data to generate a source code attribution database, according to some embodiments.

FIG. 10 is a flowchart diagram for a method 1000 for parsing license format data to generate a source code attribution database, according to some embodiments. The method 1000 may be implemented by one or more computing devices. The method 1000 may be implemented by code license attribution database builder 132 of FIG. 1 or database builder 204 of FIG. 2, according to some embodiments.

The method 1000 may include obtaining, at a license database builder, license format data from a license data repository, at 1002. The method 1000 may include determining respective text types of respective portions of the license format data, at 1004. The method 1000 may further include annotating the respective portions with the determined respective text types, at 1006. The method 1000 may conclude by generating at least a portion of the source code attribution database according to the tagged license format data, at 1008.

Figure 11:
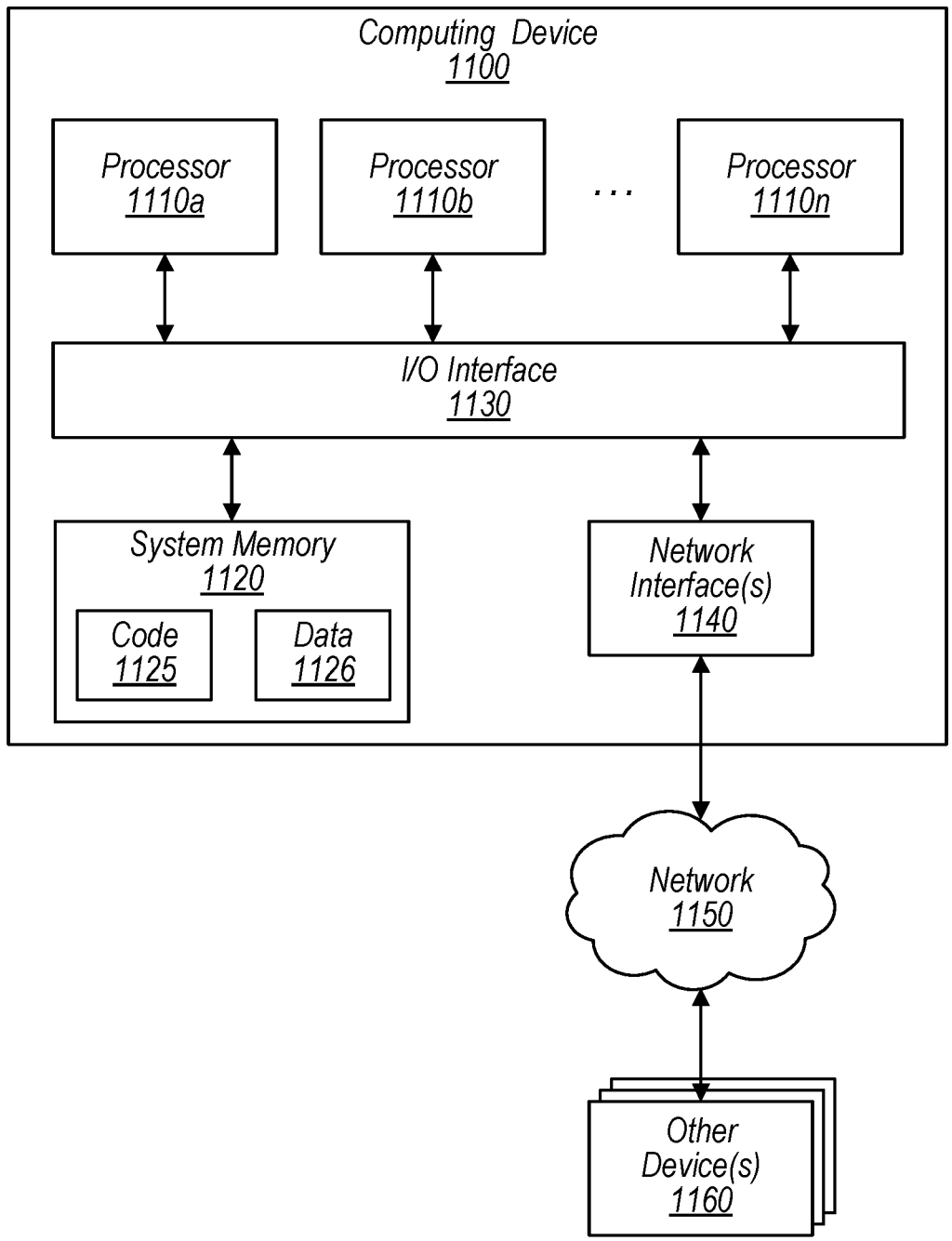
FIG. 11 is a block diagram showing an example computing device to implement the various techniques described herein, according to some embodiments.

FIG. 11 shows an example computing device to implement the various techniques described herein, according to some embodiments. For example, in one embodiment, the algorithm execution management system described above may be implemented by a computer device, for instance, a computer device as in FIG. 11 that includes one or more processors executing program instructions stored on a computer-readable storage medium coupled to the processors. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be one embodiment of a computer-accessible medium configured to store instructions and data accessible by processor(s) 1110. In various embodiments, system memory 1120 may be implemented using any non-transitory storage media or memory media, such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140. In the illustrated embodiment, program instructions (e.g., code) and data implementing one or more desired functions, such as the algorithm execution management system described above in FIGS. 1-8, are shown stored within system memory 1130 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fiber Channel SANs, or via any other suitable type of network and/or protocol.

In some embodiments, system memory 1120 may be one embodiment of a computer-accessible medium configured to store program instructions and data as described above for FIG. 1-8. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A system, comprising:
one or more computing devices that implement a code suggestion service configured to:
receive a request that specifies one or more licensing criteria via an interface of the code suggestion service;
determine respective licenses for respective ones of a plurality of source code files according to a source code attribution database that comprises indications of the respective licenses identified from parsing the plurality of source code files that are applicable to the plurality of source code files;
generate a set of candidate code suggestions for received code input based, at least in part, on the plurality of source code files;
determine one or more code suggestions from the set of candidate code suggestions that satisfy the one or more licensing criteria based, at least in part, on the respective licenses for respective ones of the plurality of source code files; and
provide the one or more code suggestions determined from the set of candidate source code files that satisfy the one or more licensing criteria.

2. The system of claim 1, further comprising one or more additional computing devices that implement a license attribution service configured to:
identify the plurality of source code files for license attribution;
parse the plurality of source code files to extract one or more text blocks;
compare the one or more text blocks to a plurality of licenses to determine similarity scores between respective ones of the one or more text blocks and the plurality of licenses;
based on the similarity scores, identify one or more of the plurality of licenses that are applicable to individual ones of the plurality of source code files; and
store, to the source code attribution database, the indications of the respective licenses applicable to the respective ones of the plurality of source code files.

3. The system of claim 2, wherein the license attribution service is further configured to:
retrieve the plurality of licenses from a license repository; and
store the plurality of licenses to a data store.

4. The system of claim 2, wherein to compare the one or more text blocks to the plurality of licenses to determine the similarity scores between the respective ones of the one or more text blocks and the plurality of licenses, the license attribution service is configured to:
identify strings of the one or more text blocks that match with strings of the plurality of licenses; and
determine the similarity scores based on a number of the identified of the one or more text blocks that match with strings of the plurality of licenses.

5. The system of claim 1, further comprising one or more computing devices configured to implement a database builder service configured to:
obtain license format data from a license data repository;

determine respective text types of respective portions of the license format data;

annotate the respective portions with the determined respective text types; and generate at least a portion of the source code attribution database according to the annotated license format data.

6. A method, comprising:

performing, by one or more computing devices that implement a code suggestion service:

determining respective licenses for respective ones of a plurality of source code files according to a source code attribution database that comprises indications of the respective licenses for the respective source code files;

generating a set of candidate code suggestions for received code input based, at least in part, on the plurality of source code files;

determining one or more code suggestions from the set of candidate code suggestions that satisfy one or more licensing criteria; and providing the one or more code suggestions determined from the set of candidate source code files that satisfy the one or more licensing criteria.

7. The method of claim 6, further comprising:

identifying the plurality of source code files for license attribution;

parsing the plurality of source code files to extract one or more text blocks;

comparing the one or more text blocks to a plurality of licenses to determine similarity scores between respective ones of the one or more text blocks and the plurality of licenses;

based on the similarity scores, identifying one or more of the plurality of licenses that are applicable to individual ones of the plurality of source code files; and storing, to the source code attribution database, the indications of the respective licenses applicable to the respective ones of the plurality of source code files.

8. The method of claim 7, wherein the one or more text blocks comprise code comments included as part of the one or more source code files.

9. The method of claim 7, further comprising:

retrieving the plurality of licenses from a license repository; and storing the plurality of licenses to a data store.

10. The method of claim 7, wherein comparing the one or more text blocks to the plurality of licenses to determine the similarity scores between the respective ones of the one or more text blocks and the plurality of licenses comprises:

identifying strings of the one or more text blocks that match with strings of the plurality of licenses; and determining the similarity scores based on a number of the identified of the one or more text blocks that match with strings of the plurality of licenses.

11. The method of claim 6, further comprising:

obtaining license format data from a license data repository;

determining respective text types of respective portions of the license format data;

annotating the respective portions with the determined respective text types; and generating at least a portion of the source code attribution database according to the annotated license format data.

12. The method of claim 6, wherein determining the one or more code suggestions comprises:

filtering the set of candidate code suggestions to exclude code suggestions that do not satisfy the one or more licensing criteria.

13. The method of claim 6, wherein the licensing criteria comprises one or more of intellectual property limitations, open source requirements, monetization limitations, reproduction limitations.

14. One or more computer-readable storage media storing instructions that, when executed on or across one or more processors, cause the one or more processors to:

determine respective licenses for respective ones of a plurality of source code files according to a source code attribution database that comprises indications of the respective licenses for the respective source code files;

generate a set of candidate code suggestions for received code input based, at least in part, on the plurality of source code files;

determine one or more code suggestions from the set of candidate code suggestions that satisfy one or more licensing criteria; and provide the one or more code suggestions determined from the set of candidate source code files that satisfy the one or more licensing criteria.

15. The one or more computer-readable storage media of claim 14, further comprising instructions that, when executed on or across the one or more processors, cause the one or more processors to:

identify the plurality of source code files for license attribution;

parse the plurality of source code files to extract one or more text blocks;

compare the one or more text blocks to a plurality of licenses to determine similarity scores between respective ones of the one or more text blocks and the plurality of licenses;

based on the similarity scores, identify one or more of the plurality of licenses that are applicable to individual ones of the plurality of source code files; and store, to the source code attribution database, the indications of the respective licenses applicable to the respective ones of the plurality of source code files.

16. The one or more computer-readable storage media of claim 15, wherein the one or more text blocks comprise code comments included as part of the one or more source code files.

17. The one or more computer-readable storage media of claim 14, further comprising instructions that, when executed on or across the one or more processors, cause the one or more processors to:

retrieve the plurality of licenses from a license repository; and store the plurality of licenses to a data store.

18. The one or more computer-readable storage media of claim 15, wherein to compare the one or more text blocks to the plurality of licenses to determine the similarity scores between the respective ones of the one or more text blocks and the plurality of licenses comprises, the one or more computer-readable storage media further comprise instructions that, when executed on or across the one or more processors, cause the one or more processors to:

identify strings of the one or more text blocks that match with strings of the plurality of licenses; and determine the similarity scores based on a number of the identified of the one or more text blocks that match with strings of the plurality of licenses.

19. The one or more computer-readable storage media of claim 14, further comprising instructions that, when executed on or across the one or more processors, cause the one or more processors to:
- obtain license format data from a license data repository;
- determine respective text types of respective portions of the license format data;
- annotate the respective portions with the determined respective text types; and
- generate at least a portion of the source code attribution database according to the annotated license format data.

20. The one or more computer-readable storage media of claim 14, further comprising instructions that, when executed on or across the one or more processors, cause the one or more processors to:
- filtering the set of candidate code suggestions to exclude code suggestions that do not satisfy the one or more licensing criteria.

\* \* \* \* \*